United States Patent [19]

Millar et al.

[11] 4,238,023
[45] Dec. 9, 1980

[54] APPARATUS FOR ORIENTING HOLLOW, CAP-LIKE ARTICLES

[75] Inventors: Barry C. Millar, Islington; Keith W. Little, Georgetown, both of Canada

[73] Assignee: Promatic International Limited, Mississauga, Canada

[21] Appl. No.: 43,113

[22] Filed: May 29, 1979

[51] Int. Cl.³ .............................................. B65G 47/24
[52] U.S. Cl. ..................................... 198/388; 198/392; 198/393
[58] Field of Search ............... 198/388, 392, 393, 397, 198/493; 221/160

[56] References Cited

U.S. PATENT DOCUMENTS

| | | | |
|---|---|---|---|
| 3,338,373 | 8/1967 | Aidlin et al. | 198/397 |
| 3,791,553 | 2/1974 | Aidlin et al. | 198/388 X |
| 3,797,640 | 3/1974 | Aidlin et al. | 198/493 X |

Primary Examiner—James L. Rowland
Attorney, Agent, or Firm—Sim & McBurney

[57] ABSTRACT

Apparatus is provided for orienting cap-like articles in the same direction and delivering them to an exit port from which the cap-like articles may be delivered to any suitable apparatus for placing them over the ends of tubes, bars or other parts. Included is a rotatably mounted member having a surface which is inclined at an acute angle to the horizontal and which is provided with a number of radially extending grooves therein each with an open end remote from the center of the rotatable member. Pins are located in each of the grooves opposite the open ends thereof and receive thereover and retain caps thereon when the caps are delivered to the pins via the grooves with the open ends of the caps facing the pins. A reservoir for caps is arranged adjacent to and in communication with a portion of the aforementioned member so that caps in the reservoir are picked up in the grooves as the surface rotates past the reservoir. One or more fluid jets are provided at a point after the location where the caps are picked up in the grooves from the reservoir to remove from the grooves all but caps that are retained on the pins. Further around in the direction of rotation of the member than the fluid jets is an exit port which communicates with the open ends of the grooves as they move past the exit port. The exit port receives from the grooves caps all oriented in the same direction. These caps fall towards the exit port under the influence of gravity but may be positively moved toward the exit port by the provision of another fluid jet.

9 Claims, 5 Drawing Figures

APPARATUS FOR ORIENTING HOLLOW, CAP-LIKE ARTICLES

BACKGROUND OF THE INVENTION

This invention relates to apparatus for orienting in the same direction hollow, cap-like articles each having an open end.

Plastic tube caps commonly are used to seal off the inside of tubes and tubular parts as protection against the ingress of dirt. This technique is used in connection with tubular parts which are supplied to the domestic refrigerator industry or for hydraulic applications. Also, plastic caps often are used as a means of covering up the cut ends of tubes or bars in order to avoid the sharp end of the cut pieces posing a hazard to personnel handling the same, or to protect threaded ends of the pieces.

Because of the light weight of the plastic caps, compared to their size, they are difficult to orient, feed and assemble over the ends of the parts by automatic methods, and hand orientation and feeding is the customary method used.

In accordance with the instant invention there is provided apparatus that makes it possible to separate individual plastic caps from a bulk and random group and to supply them in a continuous stream, all oriented in the same direction, to an exit port from which they may be delivered to a suitable apparatus for applying them to the ends of tubes, bars or other pieces or to an operator if hand assembly is to be employed.

Thus, in accordance with the instant invention there is provided apparatus for orienting in the same direction hollow, cap-like articles, each having an open end comprising a member rotatably mounted about an axis of rotation, said member having a surface inclined at an acute angle to the horizontal, said surface having a plurality of radially extending grooves therein each having an open end remote from the said axis of rotation of said member, pin means located in said grooves opposite the open ends thereof and closer to said axis of rotation than to the open ends of said grooves, said pin means being constructed and arranged to receive thereover and retain caps thereon when said caps are delivered under the influence of gravity to said pin means via said grooves with the open ends of said caps facing said pin means, means for rotating said member about said axis of rotation, a reservoir for caps arranged adjacent to and in communication with a portion of said surface, whereby caps in said reservoir are picked up in said grooves as said surface rotates past said reservoir, first means for directing a fluid under pressure into or over said grooves at a point after the location where caps are picked up in said grooves from said reservoir to remove from said grooves all but caps retained on said pins, an exit port located further around in the direction of rotation of said member than said fluid directing means, said exit port communicating with the open ends of said grooves as said grooves move past said exit port and receiving from said grooves caps all oriented in the same direction.

BRIEF DESCRIPTION OF THE DRAWINGS

This invention will become more apparent from the following detailed description, taken in conjunction with the appended drawings, in which.

DETAILED DESCRIPTION OF THE INVENTION INCLUDING THE PREFERRED EMBODIMENT

Figure 1:
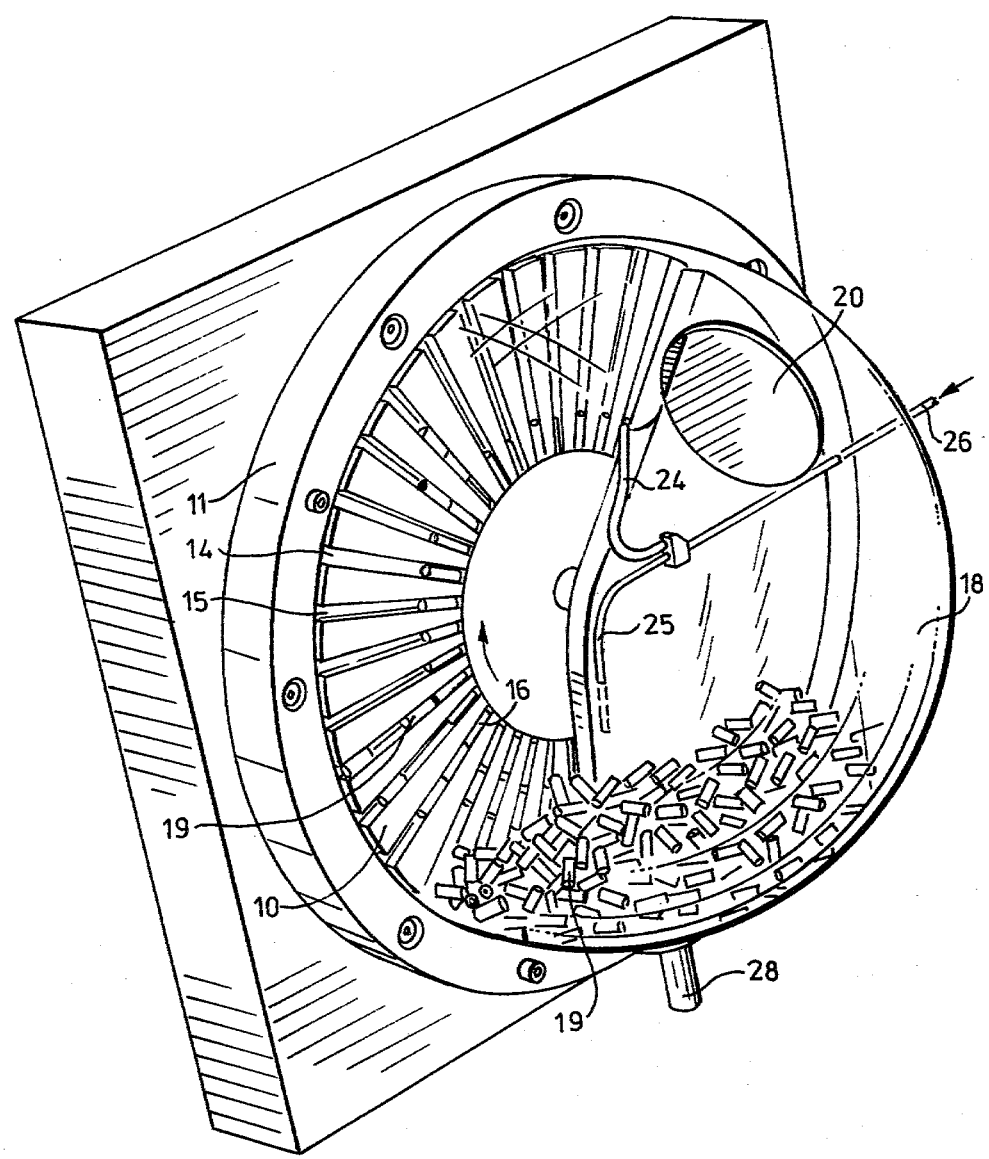
FIG. 1 is a perspective view of apparatus embodying the instant invention.
Figure 2:
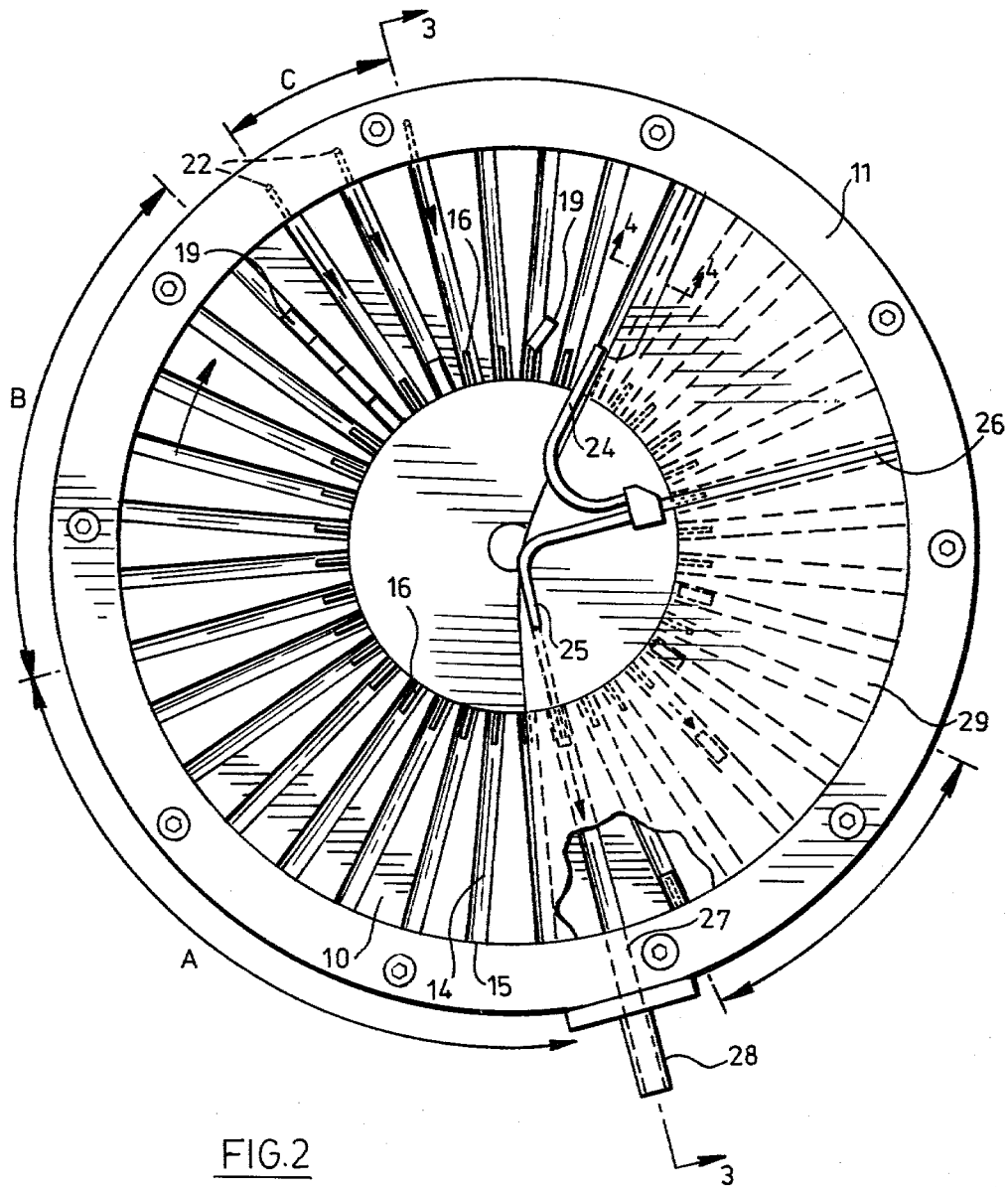
FIG. 2 is an elevation view of the apparatus shown in FIG. 1 with the hemisphere shown in FIG. 1 removed.
Figure 3:
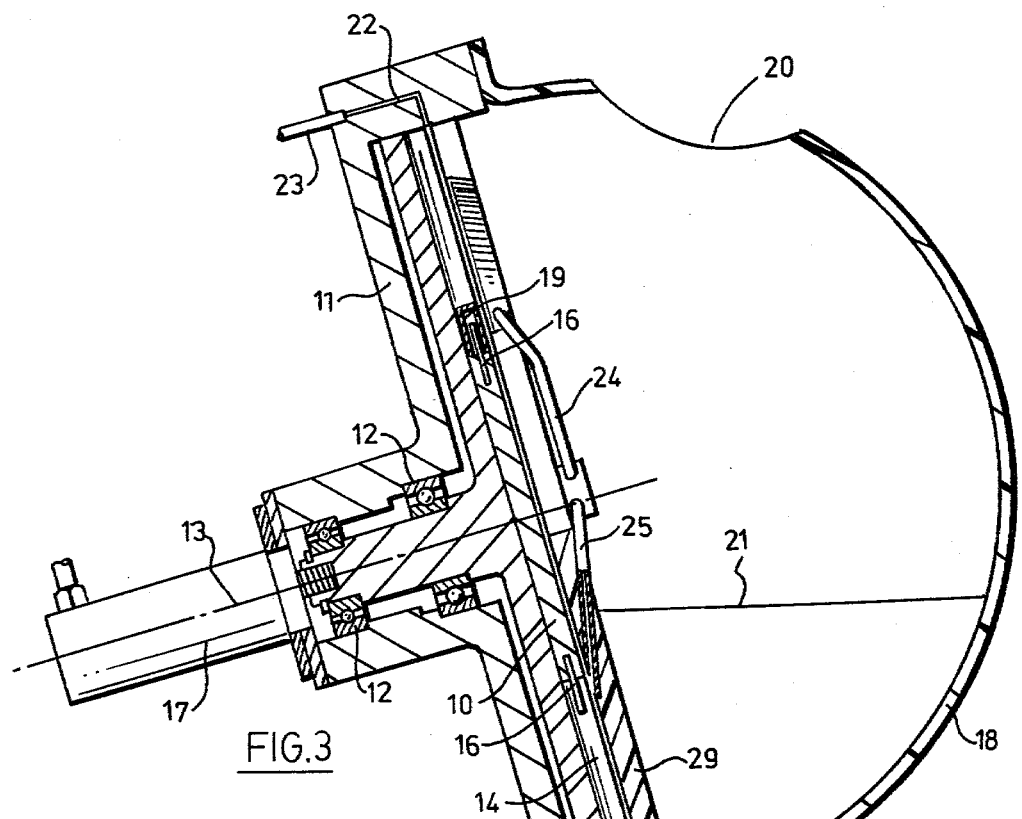
FIG. 3 is a section taken along line 3—3 in FIG. 2.
Figure 4:
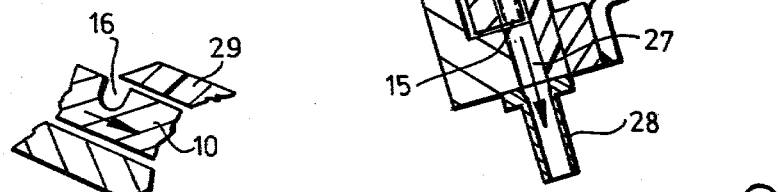
FIG. 4 is a section taken along line 4—4 in FIG. 2.
Figure 5:
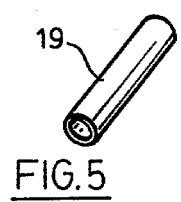
FIG. 5 is a perspective view of a cap that may be oriented using apparatus embodying the instant invention.

Referring to the drawings there is shown a member 10 that advantageously is in the form of a circular disk and which is rotatably mounted in a housing 11 by means of bearings 12 for rotation about an axis 13. It will be noted that disk 10 is inclined at an acute angle to the horizontal. An angle of 75° has been found suitable but is not critical.

The outer surface of disk 10 includes a plurality of radially extending grooves 14 therein each having an open end 15 remote from the center of disk 10.

Located at the bottom of each groove, i.e., at the end of each groove opposite to the open end thereof, is a pin 16 that is so disposed as to receive thereover and retain thereon a cap, provided that the cap is delivered to the pin via the groove 14 with the open end of the cap facing the pin.

Any suitable means may be provided for rotating disk 10. In the embodiment of the invention illustrated a pneumatic motor 17 is employed for this purpose.

A reservoir 18 which, in the present embodiment, simply is a hemisphere constructed of any suitable synthetic plastics material is arranged adjacent to and in communication with a portion of the surface of disk 10 so that caps 19 in the reservoir can be picked up in grooves 14 as the surface of disk 10 rotates past the portion of the reservoir containing caps 19.

Reservoir 18 has an opening 20 therein at the top of the reservoir through which caps 19 may be charged into the reservoir. The normal fill level of caps 19 is shown at 21.

Located above the normal fill level 21 for caps in reservoir 18 are a plurality of openings 22 in housing 11. These openings constitute air jets which are arranged to direct air or other fluid under pressure radially inwardly over the top of the grooves 14 at a location beyond the point where caps 19 are picked up in the grooves from the reservoir. While three air jets are shown in the embodiment illustrated, this is not essential, and more or less air jets may be employed. Air jets 22 are connected via tubing 23 to a suitable compressed air supply.

Further around in the direction of rotation of disk 10 from air jets 22 is an additional air jet 24 that is arranged to direct air radially outwardly into grooves 14 as the grooves pass by this air jet. The air from jet 24 impinges on each groove at a point located slightly more than one cap length from the bottom of the groove.

A further air jet 25 is provided even further around in the direction of rotation of disk 10 from air jets 22. Air jet 25, like air jet 24, also is arranged to direct air radially outwardly into grooves 14 as they pass thereby. In the case of jet 25, however, the point of impingement of air from the jet is at the bottom of each groove. Both air jets 24 and 25 are connected via a tube 26 to any suitable compressed air supply.

Located in housing 11 at the bottom thereof is an exit port 27 that communicates with the open ends 15 of grooves 14 as they pass thereby. Connected to exit port 27 is an exit tube 28 leading to a work station where caps oriented in the same direction may be delivered to any suitable apparatus for automatically assembling them over the ends of metal tubes or to an operator for hand assembly.

Extending over the portion of the surface of disk 10 located between air jet 24 and slightly beyond air jet 25 is a cover plate 29, the purpose of which will become more apparent hereinafter in connection with the description of the operation of the apparatus. It will be noted that air jet 25 extends through cover plate 29.

While reference has been made specifically herein to air jets and a compressed air supply, this is not essential to the instant invention and any source of gas under pressure may be employed.

The operation of the apparatus now will be described.

The reservoir 18 is charged with plastic caps 19 to the level 21 and rotation of disk 10 is commenced. In the general area designated A the plastic caps 19 are in direct contact with the surface of disk 10, and some of the plastic caps will fall into grooves 14. More than one plastic cap may fall into any given groove, and the orientation of the plastic caps in the grooves will be random in nature.

In the area designated B the plastic caps picked up in the grooves will fall towards pins 16. If the first plastic cap in the groove has its closed end adjacent the pin in that groove, obviously the pin will not extend into the plastic cap. However, if the opposite is the case, the plastic cap generally will be received over and retained on the pin. All other plastic caps in the same groove will be retained in the groove only by virtue of the inclination of disk 10.

As the grooves 14 rotate through the area designated C, air is directed radially inwardly over the grooves 14 via air jets 22, and all of the plastic caps in the grooves except for those received over and retained on pin 16 will be lifted out of the grooves and back into the reservoir. In the preferred embodiment of the invention low pressure air jets 22 are employed and the air therefrom is directed over grooves 14 and lifts caps 19 out of the grooves.

Very rarely a properly oriented plastic cap will not properly seat itself on its associated pin, possibly as a result of an imperfection in its manufacture, and will sit adjacent the top of the pin at an angle thereto. This cap is partly retained by the pin and may not be lifted out by air jets 22. It is the function of air jet 24 to remove the occasional caps so disposed.

After grooves 14 move under cover plate 29, all of the caps contained therein will be oriented in the same direction, i.e., with the open ends of the caps facing towards the center of disk 10, but, it will be appreciated, there may not be a cap present in each groove.

Once the grooves pass into the region designated D, the plastic caps 19 fall off pins 16 under the influence of gravity and move towards housing 11. When the open ends 15 of grooves 14 come into registry with exit port 27, it will be obvious that the plastic caps in the grooves will fall into exit port 27. To speed up this process air jet 25 is provided to positively blow caps 19 into exit port 27 and thence into tube 28.

The function of cover plate 29 should be apparent from the foregoing description. However, it is pointed out that once grooves 14 have rotated past air jet 24, all of the caps retained on pins in the grooves are properly oriented, and the possibility of further caps falling into grooves 14 beyond this point and up to the point where the properly oriented caps exit from the equipment must be avoided. This is achieved by cover plate 29 which, it will be noted, prevents plastic caps in reservoir 19 from moving into grooves 14 over the whole surface of disk 10 that is covered by the cover plate.

In the event that air jet 24 were not employed, cover plate 29 may be extended to cover the surface of disk 10 up to a point immediately adjacent to the last of the three air jets 22.

It also should be appreciated that other means could be employed to serve the function of cover plate 29. Thus, for example, reservoir 18 may be constructed in such a way as to occupy only the space above disk 10 not covered by cover plate 29 in the figures. In this event, however, it would be desirable to have some form of cover plate extending radially outwardly from air jet 25 to prevent caps in that location from being blown out of groove 14 rather than into exit port 27.

While in the preferred embodiment of this invention both types of air jets 22 and 24 are employed, this is not essential to the invention in its broadest aspect, and all that is required are jets that function to remove from grooves 14 all of caps 19 therein except those which are properly seated on pins 16.

While a preferred embodiment of the instant invention has been disclosed herein, those skilled in the art will appreciate that changes and modifications may be made therein without departing from the spirit and scope of the invention as defined in the appended claims.

We claim:

1. Apparatus for orienting in the same direction hollow, cap-like articles, each having an open end comprising a member rotatably mounted about an axis of rotation, said member having a surface inclined at an acute angle to the horizontal, said surface having a plurality of radially extending grooves therein each having an open end remote from said axis of rotation of said member, pin means located in said grooves opposite the open ends thereof and closer to said axis of rotation than to the open ends of said grooves, said pin means being constructed and arranged to receive thereover and retain caps thereon when said caps are delivered under the influence of gravity to said pin means via said grooves with the open ends of said caps facing said pin means, means for rotating said member about said axis of rotation, a reservoir for caps arranged adjacent to and in communication with a portion of said surface, whereby caps in said reservoir are picked up in said grooves as said surface rotates past said reservoir, first means for directing a fluid under pressure into or over said grooves at a point after the location where caps are picked up in said grooves from said reservoir to remove from said grooves all but caps retained on said pins, an exit port located further around in the direction of rotation of said member than said fluid directing means, said exit port communicating with the open ends of said grooves as said grooves move past said exit port and receiving from said grooves caps all oriented in the same direction.

2. Apparatus according to claim 1 including second means for directing a fluid under pressure into said grooves, said second means being constructed and arranged to blow said caps from said grooves into said exit port.

3. Apparatus according to claim 1 wherein said exit port is located adjacent the bottom of said member and said caps fall off said pin means and towards the open ends of said grooves under the influence of gravity as the open ends of said grooves approach said exit port.

4. Apparatus according to claim 1 including cover means extending over the portion of said surface located between said first fluid directing means and said exit port and covering the grooves located in said portion of said surface, said cover means preventing caps in said reservoir from moving into said grooves so covered by said cover means.

5. Apparatus according to claim 1 including second means for directing a fluid under pressure into said grooves at a point after the location of said first fluid directing means in the direction of rotation of said member, said second fluid directing means being constructed and arranged to blow out of said grooves all caps therein that are not properly seated on said pin means.

6. Apparatus according to claim 5 wherein said first means directs fluid radially inwardly over said grooves and said second means directs fluid radially outwardly into said grooves.

7. Apparatus according to claim 6 including third means for directing a fluid under pressure into said grooves at a point after the location of said second fluid directing means in the direction of rotation of said member, said third fluid directing means being constructed and arranged to blow said caps from said grooves into said exit port and directing fluid radially outwardly into said grooves.

8. Apparatus according to claim 7 including cover means extending over the portion of said surface located between said second fluid directing means and said exit port and covering the grooves located in said portion of said surface, said cover means preventing caps in said reservoir from moving into said grooves so covered by said cover means.

9. Apparatus according to claim 8 wherein said third fluid directing means includes a fluid passage extending through said cover means.

* * * * *